United States Patent Office.

SAMUEL C. PRUDEN, OF ATHENS, OHIO.

Letters Patent No. 64,702, dated May 14, 1867.

IMPROVED COMPOSITION FOR PENCILS.

*The Schedule referred to in these Letters Patent and making part of the same.*

TO ALL WHOM IT MAY CONCERN:

Be it known that I, S. C. PRUDEN, of Athens, in the county of Athens, and State of Ohio, have invented a new and improved Indelible Pencil; and I do hereby declare that the following is a full, clear, and exact description thereof, which will enable others skilled in the art to fully understand and make use of the same.

The present invention relates to a composition for indelible pencils, which consists of the ingredients mixed together in or about the proportions herein below stated, viz:

One (1) ounce alum, (pulverized;) one (1) ounce sorghum, or sugar; one-fourth ($\frac{1}{4}$) ounce of gum arabic dissolved in water; one-fourth ($\frac{1}{4}$) ounce gall-nut, or any other good bitter.

If the pencil is to be black, black ink or lamp-black is added to the above-named ingredients until as dark as desired, when, having stirred and mixed the whole thoroughly together, place it in a kettle, previously greased with petroleum, butter, or lard, or other suitable material, in which kettle subject it to a slow heat and stir until it becomes a thick gum or plastic. Then mix with it, by stirring or otherwise, as much lamp-black as is possible, without destroying the spirit of the gum, when, with the mixture thus produced, black pencils can be made. In lieu of reducing the mixture to a gummy state, as above specified, it may be crystallized. If other colored pencils are desired, as, for instance, red, in lieu of using black ink and lamp-black, as above specified, for producing a black pencil, red ochre, cochineal, or red ink is to be used, and so on through the whole series of colors, the coloring of the mixture for the pencils forming no part of the present invention.

I claim as new, and desire to secure by Letters Patent—

An indelible pencil formed of the ingredients hereinabove named, mixed in or about the proportions substantially as described.

SAM. C. PRUDEN.

Witnesses:
AUGUSTUS W. CONE,
HIRAM C. MARTIN.